(12) United States Patent
Uchida

(10) Patent No.: US 8,289,629 B2
(45) Date of Patent: Oct. 16, 2012

(54) IMAGING OPTICAL SYSTEM

(75) Inventor: Yoshihiro Uchida, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/927,195

(22) Filed: Nov. 8, 2010

(65) Prior Publication Data

US 2011/0122510 A1   May 26, 2011

Related U.S. Application Data

(63) Continuation of application No. PCT/JP2009/058436, filed on Apr. 22, 2009.

(30) Foreign Application Priority Data

May 8, 2008   (JP) .................................. 2008-122226

(51) Int. Cl.
*G02B 13/18* (2006.01)
*G02B 9/12* (2006.01)

(52) U.S. Cl. ........................................ 359/716; 359/791

(58) Field of Classification Search .................. 359/786, 359/791, 784, 713–714, 715–716

See application file for complete search history.

(56) References Cited

U.S. PATENT DOCUMENTS

| | | | | |
|---|---|---|---|---|
| 7,355,801 B2 * | 4/2008 | Chen et al. | .................... | 359/773 |
| 7,508,601 B2 * | 3/2009 | Murakami et al. | ............ | 359/791 |
| 7,535,659 B2 * | 5/2009 | Sano | ............................. | 359/773 |
| 7,558,006 B2 * | 7/2009 | Choi et al. | ..................... | 359/716 |
| 7,633,690 B2 * | 12/2009 | Yasuhiko | ...................... | 359/773 |
| 2003/0184883 A1 * | 10/2003 | Sato et al. | ...................... | 359/784 |

FOREIGN PATENT DOCUMENTS

| | | |
|---|---|---|
| JP | 2004-184987 | 7/2004 |
| JP | 2006-309043 | 11/2006 |

OTHER PUBLICATIONS

"Photonics Dictionary—Definitions, Abbreviations, Illustrations, Terms." Photonics.com: Optics, Lasers, Imaging & Fiber Information Resource. Web. Nov. 2, 2011. <http://www.photonics.com/Directory/Dictionary/>.*

Hecht, Eugene. Optics. Reading, MA: Addison-Wesley, 1998. 174-175.*

* cited by examiner

*Primary Examiner* — Ricky Mack
*Assistant Examiner* — Zachary Wilkes
(74) *Attorney, Agent, or Firm* — Kenyon & Kenyon LLP

(57) ABSTRACT

The imaging optical system of the invention is built up of, in order from its object side, the first lens group G1 having positive refracting power, the stop S, the second lens group G2 having positive refracting power, and the third lens group G3 having negative refracting power. The first lens group G1 comprises a cemented lens consisting of the first lens L1 and the second lens L2. The second lens group G2 comprises the third lens L3. The third lens group G3 comprises the fourth lens L4. The second lens L3 has an object-side surface that is concave on its object side both on and off the optical axis, and an image-side surface being an aspheric surface that is convex on its object side on the optical axis and has one or more off-axis inflection points.

4 Claims, 5 Drawing Sheets

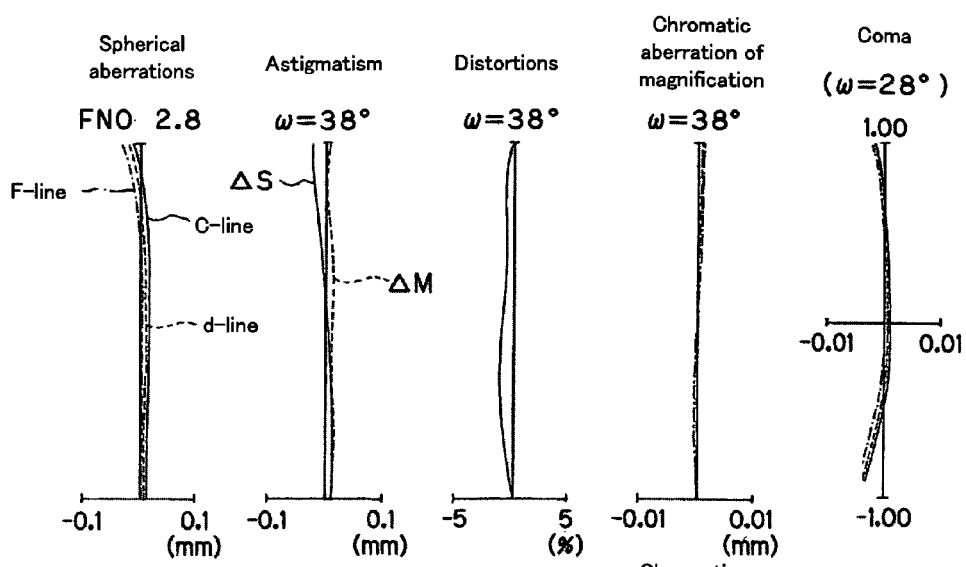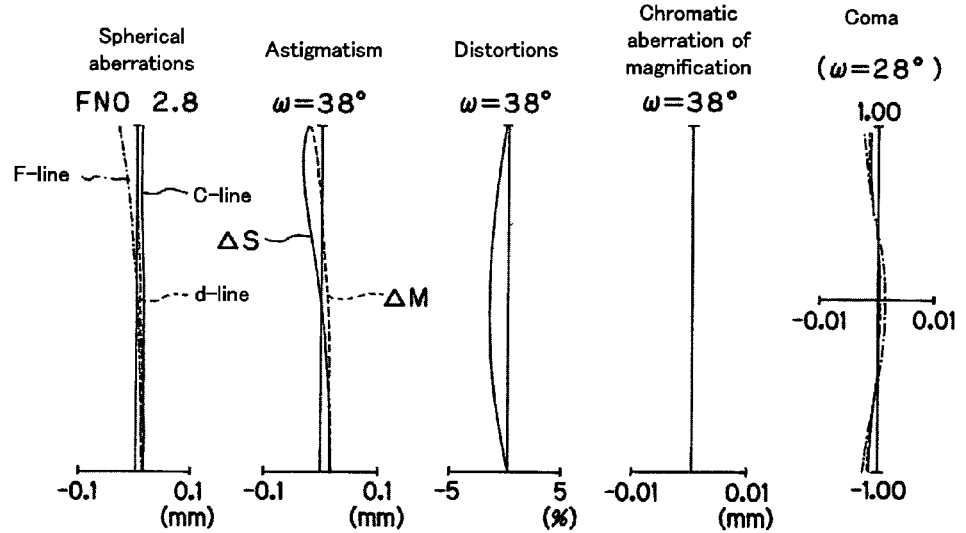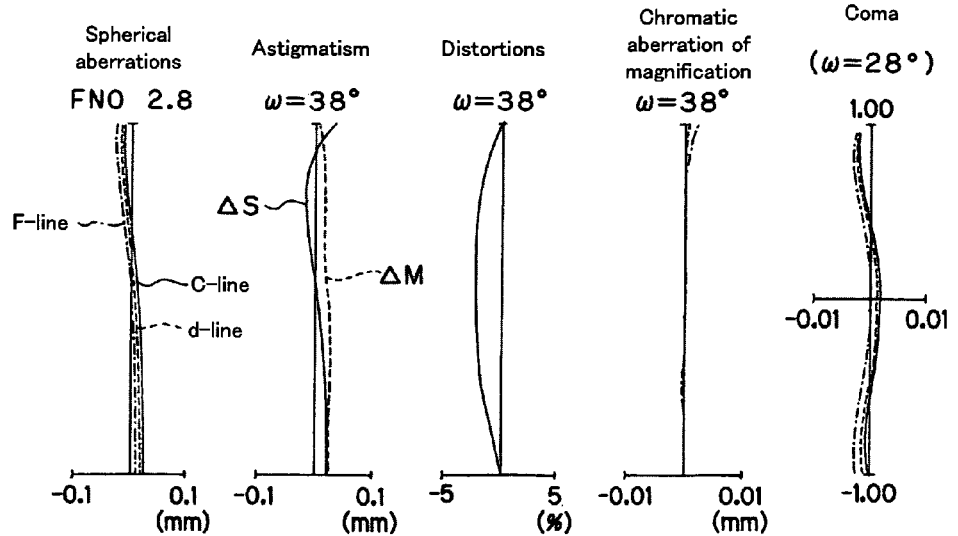

IMAGING OPTICAL SYSTEM

This application is a continuation of PCT International Application No. PCT/JP 2009/058436 filed on Apr. 22, 2009, which designates the United States. A claim of priority and the benefit of the filing date under 35 U.S.C. §120 is hereby made to PCT International Application No. PCT/JP2009/058436 filed on Apr. 22, 2009, which in turn claims priority under 35 U.S.C. §119 to Japanese Application No. 2008-122226 filed on May 8, 2008, each of which is expressly incorporated herein in its entirety by reference thereto.

BACKGROUND OF THE INVENTION

The present invention relates generally to an imaging optical system well capable of taking images of objects in a wide-angle arrangement, and more particularly to an imaging optical system that is used on portable apparatus having an imaging optical system of small size, for instance, cellular phones and personal digital assistants.

With the recent widespread use of cellular phones, there are increasing demands for camera modules mounted on personal digital assistants. In turn, technologies capable of achieving further reductions in the size of an imaging device and enabling the imaging device to have much more pixels are under development. For an associated optical system too, a camera module having improved performance and thinned as much as possible is in great need.

So far, a telephoto type of ++− power construction has been known for the type that enables lenses to be thinned; however, as there are further size reductions, it is required to increase the positive powers of the first and second lenses as well as the negative power of the third lens. However, increasing the positive powers of the first and second lenses makes longitudinal chromatic aberrations likely to occur, and increasing the negative power of the third lens renders distortion worse.

Situations being like this, it is still difficult to make sure performance with a three-lens arrangement; in recent years, an optical system designed to achieve high performance with a four-lens arrangement has been proposed in the art too.

In the imaging optical system set forth in JP(A) 2004-184987, the first group having high axial marginal rays is made up of a cemented lens to make improvements in longitudinal chromatic aberrations. However, this type works against correction of distortion because of having an asymmetrical power profile with respect to a stop. Distortion is corrected by the off-axis positive refracting power of the image-side surface of the fourth lens; however, light rays are largely bent off the optical axis, resulting in occurrence of field curvature and astigmatism.

In the imaging optical system disclosed in JP(A) 2006-309043 too, on the other hand, the first group having high axial marginal rays is made up of a cemented lens to introduce improvements in longitudinal chromatic aberrations. However, the fourth lens is configured in such a way as to have positive refracting power with a distance from the optical axis thereby easing distortion; however, light rays are largely bent, ending up with large astigmatism.

SUMMARY OF THE INVENTION

According to the present invention, there is an imaging optical system provided which comprises, in order from an object side thereof, a first lens group having positive refracting power, a stop, a second lens group having positive refracting power and a third lens group having negative refracting power, wherein said first lens group comprises a cemented lens consisting of a first lens and a second lens; said second lens group comprises a third lens; said third lens group comprises a fourth lens, and said third lens has an object-side surface concave both on and off an optical axis of the optical system and an image-side surface being an aspheric surface that is convex on the object side on the optical axis and has one or more off-axis inflection points.

The imaging optical system of the invention satisfies the following conditions (1) and (2).

$$D2/D1<4 \quad (1)$$

$$0.1<R6/R7<1.5 \quad (2)$$

where D1 is the length, as calculated on an air basis, of an axial chief ray between the image-side surface of said third lens and the object-side surface of said fourth lens, D2 is the length, as calculated on an air basis, of an off-axis chief ray having the maximum image height between the image-side surface of said third lens and the objet-side surface of said fourth lens, R6 is the radius of curvature of the image-side surface of said third lens, and R7 is the radius of curvature of the object-side surface of said fourth lens.

The imaging optical system of the invention also satisfies the following condition (3).

$$0.5<IH/\exp<1.5 \quad (3)$$

where exp is the distance from an exit pupil position to an image plane, and

IH is an image height.

The object-side surface of the fourth lens is made up of an aspheric surface, with satisfaction of the following condition (4).

$$-10<A4<0, -10<A6<0 \quad (4)$$

where r is the paraxial radius of curvature of the aspheric surface,

K is the conical coefficient,

Ai (i=4, 6, 8, 10) is the i-th order aspheric coefficient, h is a height from an optical axis, and Z is a distance from a tangent plane of a point on the aspheric surface at the height h from the optical axis and the apex of the aspheric surface.

Note here that the surface shape of the object-side surface of said fourth lens is represented by the following aspheric equation.

$$Z=(h^2/r)/[1+\{1-(K+1)\cdot(h/r)^2\}^{1/2}]+A4\times h^4+A6\times h^6+A8\times h^8+A10\times h^{10}$$

The aforesaid cemented lens is made up by cementing together said first lens formed of resin and said second lens formed of resin. The aforesaid first lens is a positive lens; the aforesaid second lens satisfies the following condition (5); and the aforesaid cemented lens satisfies the following condition (6).

$$0.05 \leq t \leq 0.2 \quad (5)$$

$$20 \leq v2-v1 \leq 40 \quad (6)$$

where t is the thickness (in mm) of said second lens, v1 is the Abbe constant of said second lens, and v2 is the Abbe constant of said first lens.

Still other objects and advantages of the invention will in part be obvious and will in part be apparent from the specification.

The invention accordingly comprises the features of construction, combinations of elements, and arrangement of

BRIEF DESCRIPTION OF THE DRAWINGS

FIG. 7 is an aberration diagram for the imaging optical system according to Example 1.

FIG. 8 is an aberration diagram for the imaging optical system according to Example 2.

FIG. 9 is an aberration diagram for the imaging optical system according to Example 3.

DESCRIPTION OF EXEMPLARY EMBODIMENTS

Figure 1:
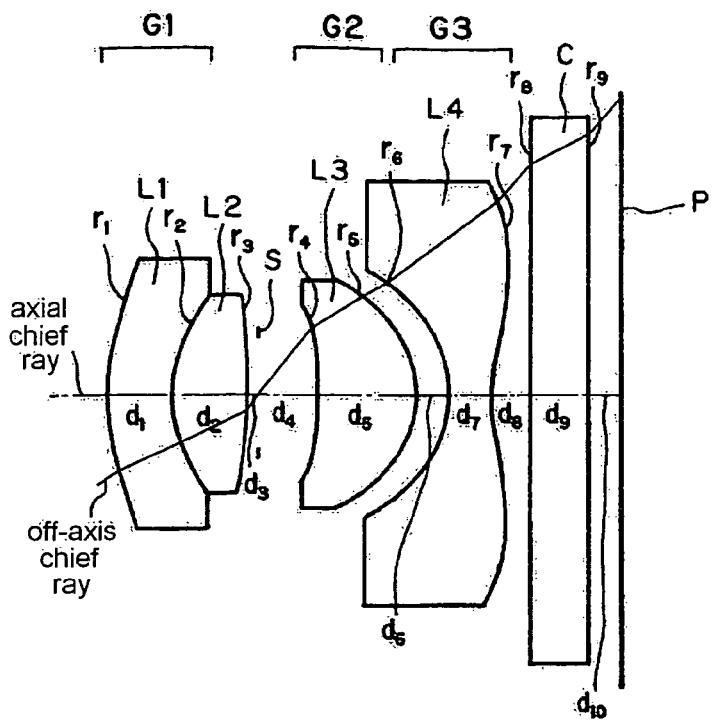
FIG. 1 is illustrative in section of the imaging optical system according to Example 1.

The imaging optical system here is characterized by comprising, in order from an object side thereof, a first lens group having positive refracting power, a stop, a second lens group having positive refracting power and a third lens group having negative refracting power, wherein said first lens group comprises a cemented lens consisting of a first lens and a second lens; said second lens group comprises a third lens; said third lens group comprises a fourth lens; and said third lens has an object-side surface concave both on and off an optical axis of the optical system and an image-side surface being an aspheric surface that is convex on the object side on the optical axis and has one or more off-axis inflection points.

By the aforesaid lens arrangement, longitudinal chromatic aberrations can be reduced at the cemented lens forming part of the first lens group. The object-side surface of the fourth lens is in a concentric configuration with respect to the stop so that field curvature is correctable. Further, the angle of incidence and refraction of off-axis rays are kept so small that the occurrence of astigmatism can be limited. The image-side surface of the fourth lens is defined by an aspheric surface including one or more inflection points and having off-axis positive refracting power, thereby correcting pin-cushion distortion and astigmatism.

The imaging optical system here is characterized by satisfying the following conditions (1) and (2).

$$D2/D1 < 4 \tag{1}$$

$$0.1 < R6/R7 < 1.5 \tag{2}$$

where D1 is the length, as calculated on an air basis, of an axial chief ray between the image-side surface of said third lens and the object-side surface of said fourth lens, D2 is the length, as calculated on an air basis, of an off-axis chief ray having the maximum image height between the image-side surface of said third lens and the objet-side surface of said fourth lens, R6 is the radius of curvature of the image-side surface of said third lens, and R7 is the radius of curvature of the object-side surface of said fourth lens.

Condition (1) is a requirement that defines the ratio between the lengths, as calculated on an air basis, the third and fourth lenses on and off the optical axis, and makes sure good correction of field curvature. As the upper limit of 4 to Condition (1) is exceeded, it causes the off-axis chief ray to become too long as calculated on an air basis, resulting in an increase in the heights of off-axis rays incident on the object side of the fourth lens. This is not preferable because of the need of bending rays largely on the object-side surface of the fourth lens, giving rise to large field curvature on the object-side surface of the fourth lens.

Likewise, Condition (2) is a requirement that defines the ratio between the radii of curvature of the opposite surfaces of the third and fourth lenses, and makes sure good correction of field curvature. As the lower limit of 0.1 to Condition (2) in the optical system of this type is not reached, it causes the curvature of the object-side surface of the fourth lens to get slack and the curvature of the image-side surface of the third lens to get tight. This is not preferable because there is unreasonable bending of rays occurring as in the prior art, with the result that field curvature goes worse. As the upper limit of 1.5 to Condition (2) is exceeded, on the contrary, it causes the sag of the object-side surface of the fourth lens to become deep. This is not preferable because the lens shape gets too complicated for fabrication.

More desirously, Conditions (1) and (2) should be narrowed down to the following Conditions (1-1) and (2-1).

$$0.2 < D2/D1 < 4 \tag{1-1}$$

$$0.5 < R6/R7 < 1.5 \tag{2-1}$$

If the lower limit to Condition (1-1) is set at not less than 0.2, it is then possible to prevent the holding of the third and fourth lenses to an associated lens barrel from getting difficult. If the lower limit to condition (2-1) is set at not less than 0.5, field curvature can then be optimally limited.

Even more desirously, condition (1-1) should be narrowed down to the following condition (1-2).

$$0.2 < D2/D1 < 1.5 \tag{1-2}$$

If the upper limit to Condition (1-2) is set at not greater than 1.5, then the angles of incidence and refraction of off-axis rays on and through the fourth lens are kept so smaller that astigmatism and coma can be much more reduced.

The imaging optical system here is characterized by satisfying Condition (3).

$$0.5 < IH/\exp < 1.5 \tag{3}$$

where exp is the distance from an exit pupil position to an image plane, and

IH is an image height.

Condition (3) is a requirement that keeps aberrations in good states off the optical axis even when the imaging optical system is set up in a wide-angle, compact arrangement. As the lower limit of 0.5 to Condition (3) is not reached, there is the need of increasing the height of off-axis rays incident on the fourth lens and refracting off-axis rays largely through the fourth lens in the optical axis direction. However, this is not preferable because large refraction of rays will give rise to astigmatism and field curvature.

If the upper limit to Condition (3) is set at not greater than 1.5, it is then possible to prevent the fourth lens from having excessive negative refracting power off the optical axis, thereby holding back the occurrence of pin-cushion distortion.

More desirously, condition (3) should be narrowed down to the following condition (3-1).

$$0.7 < IH/\exp < 1.5 \quad (3\text{-}1)$$

Not reaching the lower limit of 0.7 to Condition (3-1) is not preferable. This is because when the imaging optical system is set up in a wide-angle, compact arrangement, there is the need of increasing the height of off-axis rays incident on the fourth lens by setting the angle of off-axis rays large with respect to the optical axis. This leads to another need of refracting the rays largely through the fourth lens in the optical axis direction, with incidental occurrence of astigmatism and field curvature.

Even more desirously, Condition (3-1) should be narrowed down to the following condition (3-2).

$$0.8 < IH/\exp < 1.0 \quad (3\text{-}2)$$

Within the range of Condition (3-2), distortion, field curvature and astigmatism could be much more reduced.

The imaging optical system here is further characterized in that the object-side surface of the fourth lens is made up of an aspheric surface, with satisfaction of Condition (4).

$$-10 < A4 < 0, -10 < A6 < 0 \quad (4)$$

where r is the paraxial radius of curvature of the aspheric surface,

K is the conical coefficient,

Ai (i=4, 6, 8, 10) is the aspheric coefficient, h is a height from the optical axis, and Z is a distance from a tangent plane of a point on the aspheric surface at the height h from the optical axis and the apex of the aspheric surface.

Note here that the surface shape of the object-side surface of the fourth lens is represented by the following aspheric equation.

$$Z=(h^2/r)/[1+\{1-(K+1)\cdot(h/r)^2\}^{1/2}]+A4 \times h^4+A6 \times h^6+A8 \times h^8+A10 \times h^{10}$$

As the upper limit to Condition (4) is set at not greater than 0, the image-side surface of the fourth lens is in a concentric configuration with respect to the stop so that field curvature is correctable. In addition, the angles of incidence and refraction of off-axis rays on and through the fourth lens can be kept so small that astigmatism can be reduced. Not reaching the lower limit of −10 to Condition (4) is not preferable because of difficulty in correction of distortions, although the fourth lens may be prevented from having excessive negative refracting power off the optical axis.

More desirously, Condition (4) should be narrowed down to the following condition (4-1).

$$-1.0 < A4 < 0, -1.0 < A6 < 0 \quad (4\text{-}1)$$

As A4 and A6 in Condition (4-1) do not reach the lower limits of −1.0, there is a tendency for too strong off-axis negative power to be eased by a high-order aspheric surface because the negative refracting power becomes too strong off the optical axis. However, this is not preferable because, as the high-order aspheric coefficient grows large, it leads to a large off-axis curvature change, resulting in an increased sensitivity to decentration.

Even more desirously, Condition (4-1) should be narrowed down to the following Condition (4-2).

$$-0.5 < A4 < 0, -0.5 < A6 < 0 \quad (4\text{-}2)$$

If Condition (4-2) is satisfied, it is then possible to optimize the angle of incidence of off-axis rays on the image-side surface of the fourth lens as well as off-axis negative refracting power so that field curvature and astigmatism can be well corrected with reduced distortions.

The imaging optical system of the invention is further characterized in that the cemented lens is made up of a first positive lens of plastic material cemented to a second lens of resin material, wherein the first lens is a positive lens; the second lens satisfies the following Condition (5); and the cemented lens satisfies the following Condition (6).

$$0.05 \leq t \leq 0.2 \quad (5)$$

$$20 \leq v2-v1 \leq 40 \quad (6)$$

where t is the thickness (in mm) of the resin layer, v1 is the Abbe constant of the resin layer, and v2 is the Abbe constant of the first lens.

Condition (5) is a requirement for the thickness of the second lens as well as for satisfactory correction of longitudinal chromatic aberrations. Not reaching the lower limit of 0.05 to Condition (5) is not preferable, because the resin layer having negative refracting power becomes too thin to correct longitudinal chromatic aberrations. Exceeding the upper limit of 0.2 to Condition (5) is again not preferable, because the resin layer having negative refracting power grows thick, resulting in an increase in the total length of the optical system.

Likewise, Condition (6) is a requirement for the Abbe constant of the second lens formed as a positive lens as well as for satisfactory correction of longitudinal chromatic aberrations. Not reaching the lower limit of 20 to Condition (6) is not preferable, because the dispersion of the second lens having negative refracting power, formed as the positive lens, becomes too small, leading to overcorrection of longitudinal chromatic aberrations. Exceeding the upper limit of 40 to Condition (6) is again not preferable, because the dispersion of the second lens having negative refracting power, formed as the positive lens, becomes too large, giving rise to insufficient correction of longitudinal chromatic aberrations.

More desirously, Conditions (5) and (6) should be narrowed down to the following Conditions (5-1) and (6-1).

$$0.1 \leq t \leq 0.2 \quad (5\text{-}1)$$

$$30 \leq v2-v1 \leq 35 \quad (6\text{-}1)$$

If Conditions (5-1) and (6-1) are satisfied, it is then possible to optimize the thickness and Abbe constant of the resin layer formed as the positive lens and having negative refracting power, and make correction of longitudinal chromatic aberrations.

Examples 1 to 6 of the inventive imaging optical system are now explained with reference to the accompanying drawings in which G1 stands for the first lens group, G2 the second lens group, G3 the third lens group, L1 the first lens, L2 the second lens, L3 the third lens, L4 the fourth lens, S the aperture stop, C the cover glass, and P the image plane.

FIG. 1 is illustrative of the lens construction of Example 1 of the inventive imaging optical system.

As shown in FIG. 1, the imaging optical system of Example 1 is built up of, in order from the object side, the first lens group G1, the aperture stop S, the second lens group G2, the third lens group G3, the cover glass C, and the image plane P.

In order from the object side, the first lens group G1 is made up of a cemented lens consisting of the negative meniscus lens L1 convex on its object side and the double-convex positive lens L2; the second lens group G2 consists of one lens: the positive meniscus lens L3 convex on its image plane side; and the third lens group G3 consists of one lens: the double-concave negative lens L4.

In the imaging optical system of Example 1, as shown in FIG. 1, the first lens group G1 consists of two lenses having a cementing surface, and is capable of satisfactory correction of longitudinal chromatic aberrations. Further, although the cementing surface is configured in such a way as to be convex on its object side, it is possible to hold back the occurrence of chromatic aberration of magnification, because the lens having low dispersion is located as the second lens L2 nearer to the stop S. Further, the object-side surface of the fourth lens L4 is configured in a concentric shape with respect to the stop S so that field curvature can be corrected, and astigmatism can be kept small as well because of small angles of incidence and refraction of off-axis rays. In addition, the image-side surface of the fourth lens L4 is configured in such a way as to have off-axis positive refracting power so that distortions and astigmatism are well corrected. The second lens L2, the third lens L3 and the fourth lens L4 are all designed using the same plastic material, contributing to large cost reductions.

Numerical data on and the conditions in Example 1 will be described later.

Figure 2:
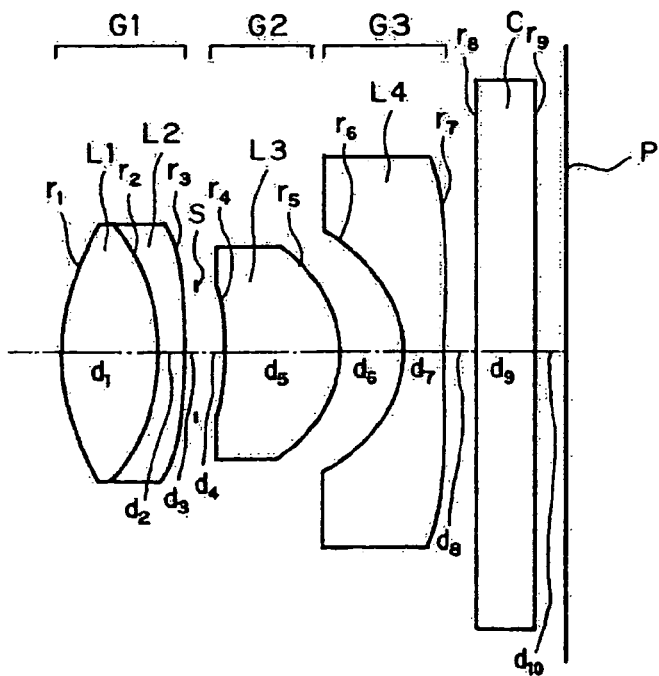
FIG. 2 is illustrative in section of the imaging optical system according to Example 2.

FIG. 2 is illustrative of the lens construction of Example 2 the inventive imaging optical system.

As shown in FIG. 2, the imaging optical system of Example 2 is built up of, in order from the object side, the first lens group G1, the aperture stop S, the second lens group G2, the third lens group G3, the cover glass C and the image plane P.

In order from the object side, the first lens group G1 is made up of a cemented lens consisting of the double-convex positive lens L1 and the negative meniscus lens L2 convex on its image plane side; the second lens group G2 is made up of one lens: the positive meniscus lens L3 convex on its image plane side; and the third lens group G3 is made up of one lens: the double-concave negative lens L4.

In the imaging optical system of Example 2, as shown in FIG. 2, the first lens group G1 consists of two lenses having a cementing surface, and is capable of satisfactory correction of longitudinal chromatic aberrations, while the object-side surface of the fourth lens L4 is configured in a concentric shape with respect to the stop S so that field curvature can be corrected, and astigmatism can be kept small as well because of small angles of incidence and refraction of off-axis rays. In addition, the image-side surface of the fourth lens L4 is configured in such a way as to have off-axis positive refracting power so that distortions and astigmatism are well corrected.

Numerical data on and the conditions in Example 2 will be described later.

Figure 3:
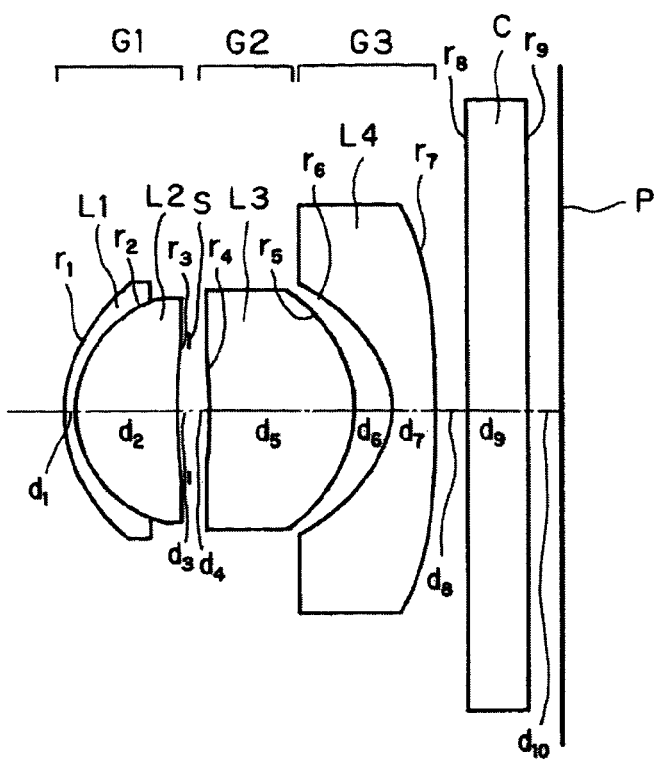
FIG. 3 is illustrative in section of the imaging optical system according to Example 3.

FIG. 3 is illustrative of the lens construction of Example 3 the inventive imaging optical system.

As shown in FIG. 3, the imaging optical system of Example 3 is built up of, in order from the object side, the first lens group G1, the aperture stop S, the second lens group G2, the third lens group G3, the cover glass C and the image plane P.

In order from the object side, the first lens group G1 is made up of a cemented lens consisting of the negative meniscus lens L1 convex on its object side and the negative meniscus lens L2 convex on its object side; the second lens group G2 is made up of one lens: the positive meniscus lens L3 convex on its image plane side; and the third lens group G3 is made up of one lens: the double-concave negative lens L4.

In the imaging optical system of Example 3, as shown in FIG. 3, the first lens group G1 consists of two lenses having a cementing surface, and is capable of satisfactory correction of longitudinal chromatic aberrations. Further, although the cementing surface is configured in such a way as to be convex on its object side, it is possible to hold back the occurrence of chromatic aberration of magnification, because the lens having low dispersion is located as the second lens L2 nearer to the stop S. In addition, the first lens L1 is made so thin that it is less susceptible of temperature and humidity changes, and the total length of the optical system can be made short as well. Furthermore, the object-side surface of the fourth lens L4 is configured in a concentric shape with respect to the stop S so that field curvature can be corrected, and astigmatism can be kept small as well because of small angles of incidence and refraction of off-axis rays. To add to this, the image-side surface of the fourth lens L4 is configured in such a way as to have off-axis positive refracting power so that distortions and astigmatism are well corrected.

Numerical data on and the conditions in Example 3 will be described later.

Figure 4:
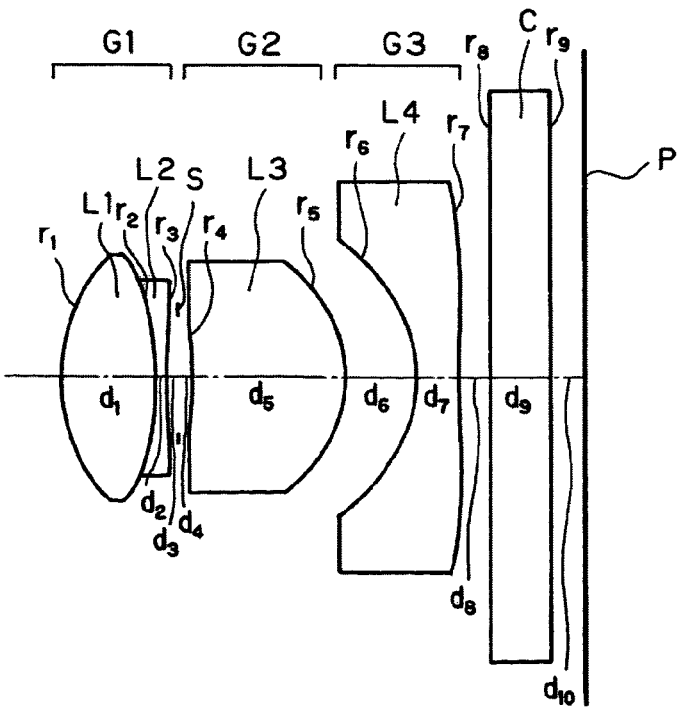
FIG. 4 is illustrative in section of the imaging optical system according to Example 4.

FIG. 4 is illustrative of the lens construction of Example 4 the inventive imaging optical system.

As shown in FIG. 4, the imaging optical system of Example 4 is built up of, in order from the object side, the first lens group G1, the aperture stop S, the second lens group G2, the third lens group G3, the cover glass C and the image plane P.

In order from the object side, the first lens group G1 is made up of a cemented lens consisting of the double-convex positive lens L1 and the double-concave negative lens L2; the second lens group G2 is made up of one lens: the positive meniscus lens L3 convex on its image plane side; and the third lens group G3 is made up of one lens: the double-concave negative lens L4.

In the imaging optical system of Example 4, as shown in FIG. 4, the first lens group G1 consists of two lenses having a cementing surface, and is capable of satisfactory correction of longitudinal chromatic aberrations. This cementing surface is in a spherical shape, helping cutting short lens fabrication costs. The object-side surface of the fourth lens L4 is configured in a concentric shape with respect to the stop S so that field curvature can be corrected, and astigmatism can be kept small as well because of small angles of incidence and refraction of off-axis rays. In addition, the image-side surface of the fourth lens L4 is configured in such a way as to have off-axis positive refracting power so that distortions and astigmatism are well corrected.

Numerical data on and the conditions in Example 4 will be described later.

Figure 5:
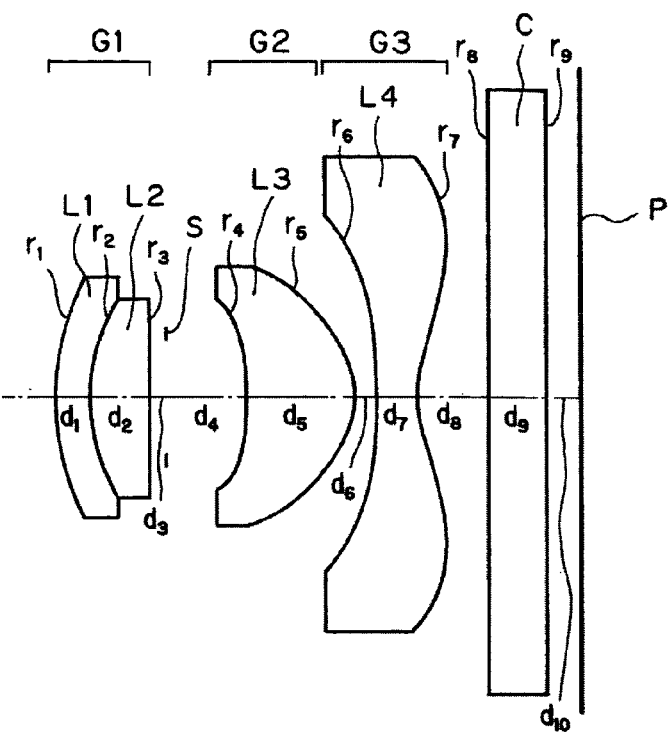
FIG. 5 is illustrative in section of the imaging optical system according to Example 5.

FIG. 5 is illustrative of the lens construction of Example 5 the inventive imaging optical system.

As shown in FIG. 5, the imaging optical system of Example 5 is built up of, in order from the object side, the first lens group G1, the aperture stop S, the second lens group G2, the third lens group G3, the cover glass C and the image plane P.

In order from the object side, the first lens group G1 is made up of a cemented lens consisting of the negative meniscus lens L1 convex on its object side and the positive meniscus lens L2 convex on its object side; the second lens group G2 is made up of one lens: the positive meniscus lens L3 convex on its image plane side; and the third lens group G3 is made up of one lens: the double-concave negative lens L4.

In the imaging optical system of Example 5, as shown in FIG. 5, the first lens group G1 consists of two lenses having a cementing surface, and is capable of satisfactory correction of longitudinal chromatic aberrations. Further, although the cementing surface is configured in such a way as to be convex on its object side, it is possible to hold back the occurrence of chromatic aberration of magnification, because the lens having low dispersion is located as the second lens L2 nearer to the stop S. Furthermore, the off-axis object-side surface of the fourth lens L4 takes on a concave surface that is gentler on the object side than that in the imaging lenses (optical systems) of Examples 1 to 4. This in turn enables the angle of incidence of the off-axis chief ray and subordinate rays to be kept so small that field curvature and astigmatism are not only reduced but the fourth lens L4 can also be easily fabricated. In addition, the image-side surface of the fourth lens L4 is configured in such a way as to have off-axis positive refracting power so that distortions and astigmatism are well corrected.

Numerical data on and the conditions in Example 5 will be given later.

Figure 6:
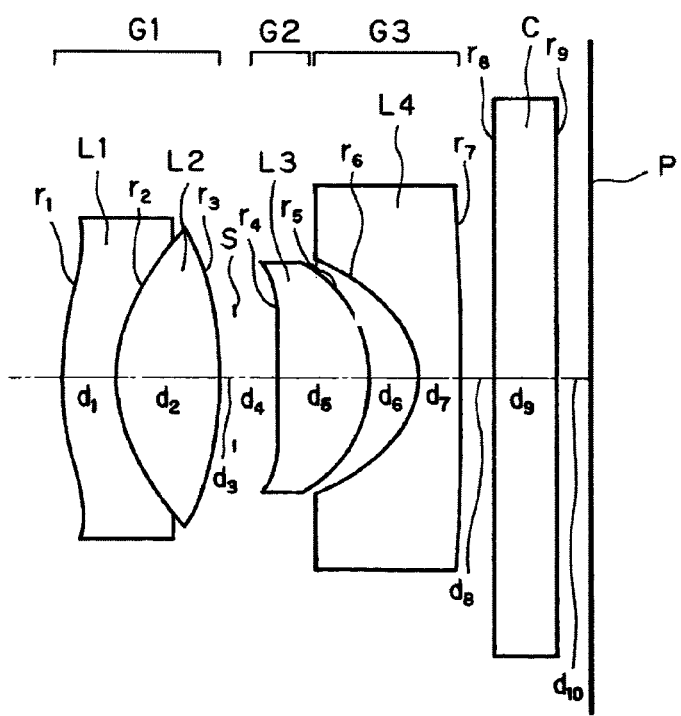
FIG. 6 is illustrative in section of the imaging optical system according to Example 6.
Figure 10:
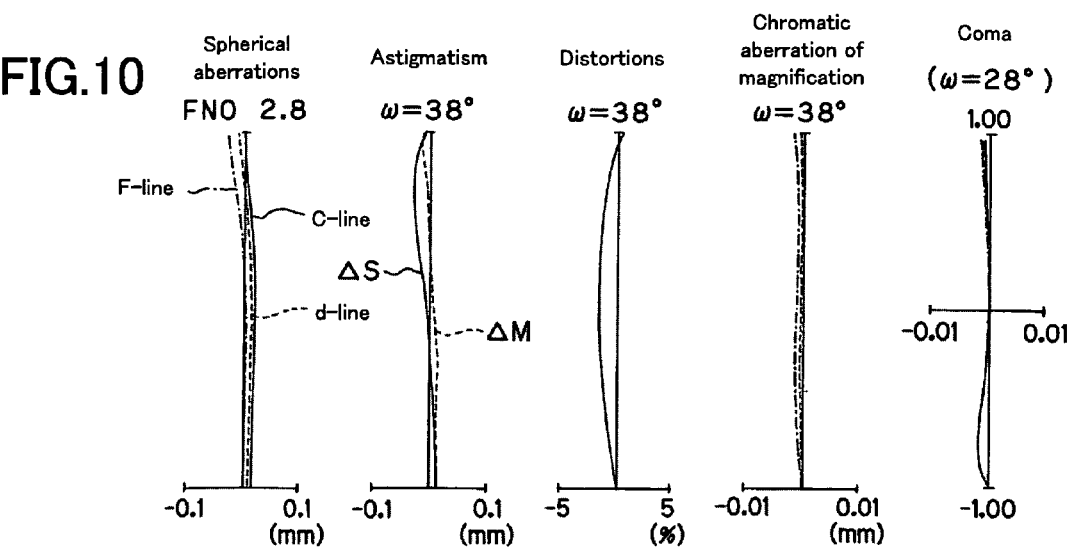
FIG. 10 is an aberration diagram for the imaging optical system according to Example 4.
Figure 11:
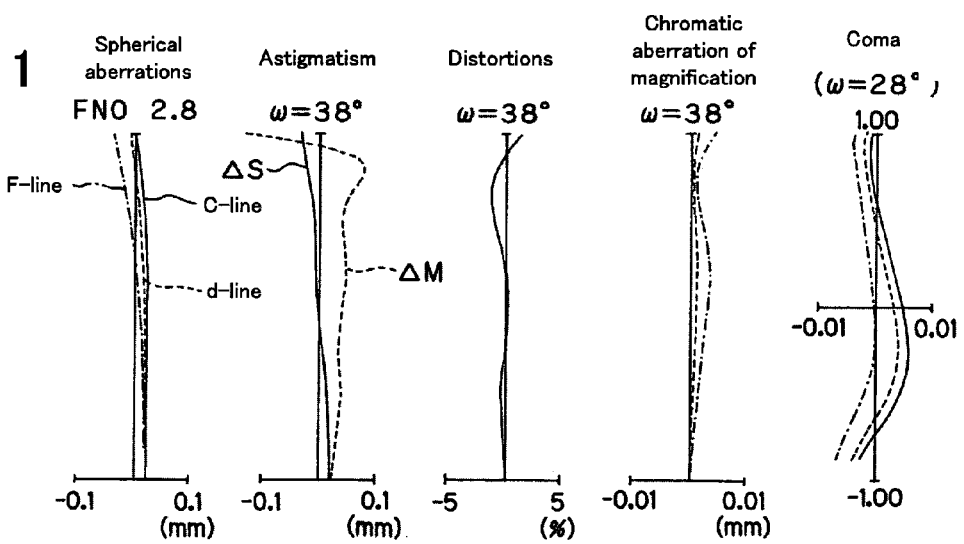
FIG. 11 is an aberration diagram for the imaging optical system according to Example 5.
Figure 12:
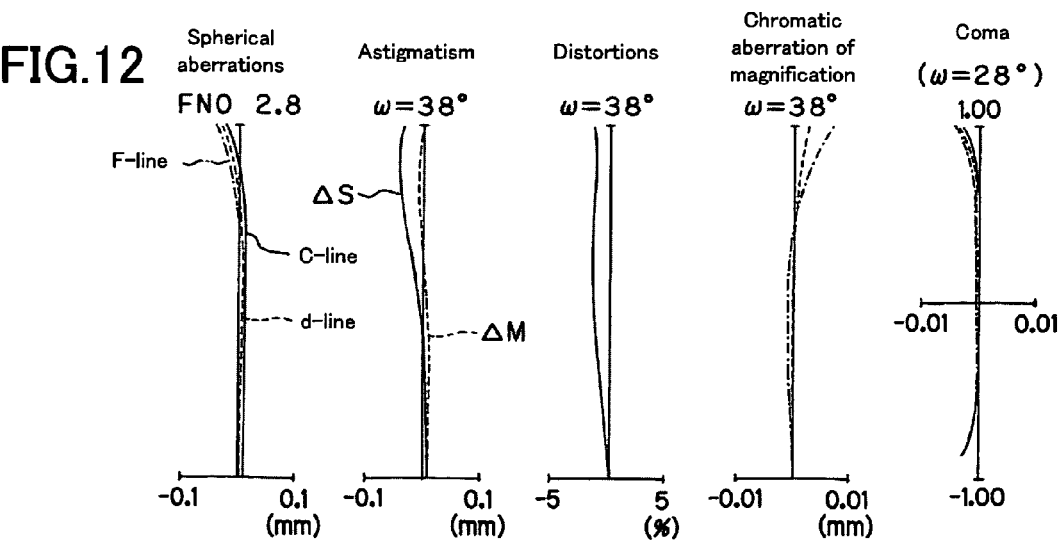
FIG. 12 is an aberration diagram for the imaging optical system according to Example 6.

FIG. 6 is illustrative of the lens construction of Example 6 of the inventive imaging optical system.

As shown in FIG. 6, the imaging optical system of Example 6 is built up of, in order from the object side, the first lens group G1, the aperture stop S, the second lens group G2, the third lens group G3, the cover glass C, and the image plane P.

In order from the object side, the first lens group G1 is made up of a cemented lens consisting of the negative meniscus lens L1 convex on its object side and the double-convex positive lens L2; the second lens group G2 consists of one lens: the double-convex positive lens L3; and the third lens group G3 consists of one lens: the double-concave negative lens L4.

In the imaging optical system of Example 6, as shown in FIG. 6, the first lens group G1 consists of two lenses having a cementing surface, and is capable of satisfactory correction of longitudinal chromatic aberrations. Further, although the cementing surface is configured in such a way as to be convex on its object side, it is possible to hold back the occurrence of chromatic aberration of magnification, because the lens having low dispersion is located as the second lens L2 nearer to the stop S. Furthermore, the object-side surface of the fourth lens L4 is configured in a concentric shape with respect to the stop S so that field curvature can be corrected, and astigmatism can be kept small as well because of small angles of incidence and refraction of off-axis rays. In addition, the image-side surface of the fourth lens L4 is configured in such a way as to have off-axis positive refracting power so that distortions and astigmatism are well corrected.

Numerical data on and the conditions in Example 6 will be described later.

The numerical data on the imaging optical systems of Examples 1 to 6 are now given below. Note here that f is the focal length of the whole optical system; Fno is the F-number; w is the half angle of view; r1, r2, . . . the radius of curvature of each lens surface; d1, d2, . . . the lens surface-to-lens surface spacing; nd1, nd2, . . . the d-line refractive index of each lens; and vd1, vd2, . . . the d-line Abbe constant of each lens.

It is noted that the rotationally symmetric aspheric surface used in Examples 1 to 6 is represented by $$Z=(h^2/r)/[1+\{1-(K+1)\cdot(h/r)^2\}^{1/2}]+A4\times h^4+A6\times h^6+A8\times h^8+A10\times h^{10}$$

where r is the paraxial radius of curvature of the aspheric surface,

K is the conical coefficient,

Ai (i=4, 6, 8, 10) is the i-th order aspheric coefficient, h is a height from the optical axis, and Z is a distance from a tangent plane of a point on the aspheric surface at the height h from the optical axis and the apex of the aspheric surface.

Of the numerical data given below, the figures indicative of the aspheric coefficient are given in terms of exponents, and E is indicative of the power of 10 (for instance, E-01 means −1 power of 10. However, the aspheric surface with no indication is zero, with the asterisk * indicative of the aspheric surface.

Numerical Example 1
Unit mm

Surface Data

| Surface No. | r | d | nd | vd |
| --- | --- | --- | --- | --- |
| 1* | 2.3621 | 0.59 | 1.6402 | 23.38 |
| 2* | 1.2371 | 0.71 | 1.5330 | 55.69 |
| 3* | −6.3549 | 0.1 | | |
| 4 (Stop) | ∞ | 0.58 | | |
| 5* | −5.0002 | 0.94 | 1.5330 | 55.69 |
| 6* | −0.8292 | 0.30 | | |
| 7* | −1.0326 | 0.40 | 1.5330 | 55.69 |
| 8* | 2.0110 | 0.33 | | |
| 9 | ∞ | 0.55 | 1.5183 | 64.14 |
| 10 | ∞ | 0.3 | | |
| Image Plane | ∞ | | | |

Aspheric Data

1st Surface

K = −1.2096, A4 = −1.1504E−02, A6 = −6.3848E−03,
A8 = −1.0000E−03

2nd Surface

K = 0.0438, A4 = −7.9988E−02, A6 = −7.2619E−02,
A8 = 5.0000E−04

3rd Surface

K = −11.6497, A4 = −2.8651E−02, A6 = 2.7355E−04
A8 = −6.2060E−04

5th Surface

K = 20.0000, A4 = −7.0905E−02, A6 = −7.8009E−03,
A8 = −9.3084E−02

6th Surface

K = −3.0817, A4 = −1.7421E−01, A6 = 1.5052E−02
A8 = 3.5992E−03, A10 = −3.4874E−02

7th Surface

K = −4.5147, A4 = −1.7027E−01, A6 = −1.0000E−02,
A8 = 1.0000E−04, A10 = 9.8095E−05

8th Surface

K = −20.0000, A4 = −4.0344E−02, A6 = 8.0000E−03
A8 = −1.2745E−03, A10 = 6.8656E−05

Various Data

| Focal Length | 3.7 |
| --- | --- |
| F-number | 2.8 |
| Half Angle of View | 37° |

Numerical Example 2
Unit mm

Surface Data

| Surface No. | r | d | nd | vd |
| --- | --- | --- | --- | --- |
| 1* | 2.1520 | 0.91 | 1.5283 | 56.45 |
| 2* | −2.0226 | 0.25 | 1.6402 | 23.38 |
| 3* | −11.9286 | 0.1 | | |
| 4 | ∞ | 0.28 | | |

Numerical Example 2
Unit mm

| | | | | |
|---|---|---|---|---|
| (Stop) | | | | |
| 5* | −4.3878 | 1.11 | 1.5886 | 30.21 |
| 6* | −1.0851 | 0.62 | | |
| 7* | −1.0590 | 0.38 | 1.6412 | 23.90 |
| 8* | 10.2956 | 0.30 | | |
| 9 | ∞ | 0.55 | 1.5183 | 64.14 |
| 10 | ∞ | 0.3 | | |
| Image Plane | ∞ | | | |

Aspheric Data

1st Surface

K = −1.8517, A4 = 9.4524E−03, A6 = −2.1465E−03,
A8 = −2.9327E−03

2nd Surface

K = −3.4376, A4 = 1.1164E−02, A6 = −1.6374E−02,
A8 = −8.0226E−03

3rd Surface

K = −5.2611, A4 = −1.9814E−02, A6 = −2.4063E−03,
A8 = −1.1128E−02

5th Surface

K = 22.5764, A4 = −8.7862E−02, A6 = −5.6463E−02,
A8 = −7.0974E−02

6th Surface

K = −2.4840, A4 = −1.3771E−01, A6 = 3.5169E−03,
A8 = −2.4686E−02

7th Surface

K = −2.5131, A4 = −1.1306E−01, A6 = −2.0534E−02,
A8 = 6.4892E−03, A10 = 5.3082E−04

8th Surface

K = −232.0398, A4 = −3.2599E−02, A6 = 7.1004E−03,
A8 = −9.0718E−04, A10 = 3.4309E−05

Various Data

| | |
|---|---|
| Focal Length | 3.7 |
| F-number | 2.8 |
| Half Angle of View | 37° |

Numerical Example 3
Unit mm

Surface Data

| Surface No. | r | d | nd | νd |
|---|---|---|---|---|
| 1* | 1.4190 | 0.10 | 1.6402 | 23.38 |
| 2 | 1.0502 | 0.90 | 1.5283 | 56.45 |
| 3* | 5.6258 | 0.11 | | |
| 4 | ∞ | 0.19 | | |
| (Stop) | | | | |
| 5* | −8.6149 | 1.28 | 1.5886 | 30.21 |
| 6* | −1.0045 | 0.33 | | |
| 7* | −0.8341 | 0.38 | 1.6412 | 23.90 |
| 8* | 306.4097 | 0.30 | | |
| 9 | ∞ | 0.55 | 1.5183 | 64.14 |
| 10 | ∞ | 0.3 | | |
| Image Plane | ∞ | | | |

Aspheric Data

1st Surface

K = −0.0862, A4 = −1.7007E−03, A6 = 1.6591E−03,
A8 = 7.7975E−04

3rd Surface

K = −5.3491, A4 = −1.0768E−03, A6 = 1.3565E−03,
A8 = −4.1494E−03

5th Surface

K = 45.5215, A4 = −7.5906E−02, A6 = 7.9125E−03,
A8 = −2.5142E−01

6th Surface

K = −2.7848, A4 = −1.1954E−01, A6 = −2.2321E−04,
A8 = −1.3306E−02

7th Surface

K = −2.6060, A4 = −1.8455E−01, A6 = −1.0401E−02,
A8 = −1.2958E−03, A10 = 4.9782E−04

8th Surface

K = −3.831E+05, A4 = −4.8512E−02, A6 = 1.0698E−02,
A8 = −1.4181E−03, A10 = 5.3335E−05

Various Data

| | |
|---|---|
| Focal Length | 3.7 |
| F-number | 2.8 |
| Half Angle of View | 37° |

Numerical Example 4
Unit mm

Surface Data

| Surface No. | r | d | nd | νd |
|---|---|---|---|---|
| 1* | 1.7289 | 0.88 | 1.5283 | 56.45 |
| 2* | −3.3387 | 0.10 | 1.6402 | 23.38 |
| 3* | 10.9103 | 0.10 | | |
| 4 | ∞ | 0.14 | | |
| (Stop) | | | | |
| 5* | −4.5087 | 1.38 | 1.5886 | 30.21 |
| 6* | −1.1318 | 0.67 | | |
| 7* | −1.1891 | 0.38 | 1.6412 | 23.90 |
| 8* | 10.2398 | 0.30 | | |
| 9 | ∞ | 0.55 | 1.5183 | 64.14 |
| 10 | ∞ | 0.3 | | |
| Image Plane | ∞ | | | |

Aspheric Data

1st Surface

K = −1.1608, A4 = 2.7771E−02, A6 = 1.1015E−02,
A8 = 2.6909E−03

2nd Surface

K = −18.3926, A4 = −7.7303E−02, A6 = 0,
A8 = −9.1173E−03

3rd Surface

K = 54.3775, A4 = −8.2947E−03, A6 = −5.1992E−02,
A8 = −1.2070E−02

5th Surface

K = 14.6735, A4 = −9.4106E−02, A6 = −4.5784E−02,
A8 = −1.5287E−01

6th Surface

K = −2.2985, A4 = −8.9822E−02, A6 = 1.0786E−04,
A8 = −7.1706E−03

7th Surface

K = −3.3189, A4 = −9.1252E−02, A6 = −1.2137E−03,

Numerical Example 4
Unit mm

A8 = 2.7849E−04
8th Surface

K = 19.5857, A4 = −3.8961E−02, A6 = 6.1177E−03,
A8 = −6.3729E−04, A10 = 4.8526E−07

Various Data

| | |
|---|---|
| Focal Length | 3.7 |
| F-number | 2.8 |
| Half Angle of View | 37° |

Numerical Example 5
Unit mm

Surface Data

| Surface No. | r | d | nd | vd |
|---|---|---|---|---|
| 1* | 2.1753 | 0.31 | 1.6402 | 23.38 |
| 2* | 1.3659 | 0.57 | 1.5283 | 56.45 |
| 3* | 1406.0030 | 0.15 | | |
| 4 (Stop) | ∞ | 0.75 | | |
| 5* | −3.0440 | 1.01 | 1.5330 | 55.69 |
| 6* | −0.7528 | 0.21 | | |
| 7* | −4.9556 | 0.38 | 1.5767 | 33.51 |
| 8* | 1.1065 | 0.66 | | |
| 9 | ∞ | 0.55 | 1.5183 | 64.14 |
| 10 | ∞ | 0.3 | | |
| Image Plane | ∞ | | | |

Aspheric Data

1st Surface

K = −1.7479, A4 = −1.4490E−02, A6 = 2.6178E−03,
A8 = 7.5479E−04
2nd Surface

K = 0.6804, A4 = −2.7397E−01, A6 = 3.6597E−02,
A8 = 1.4815E−02
3rd Surface

K = 3.379E+06, 4 = −5.2022E−03, A6 = −2.6462E−02,
A8 = 3.3012E−03
5th Surface

K = 9.0106, A4 = −8.9612E−02, A6 = 6.9516E−02,
A8 = −1.2926E−01
6th Surface

K = −2.9878, A4 = −1.4344E−01, A6 = 2.8038E−02,
A8 = 2.8038E−02, A10 = −2.2542E−02
7th Surface K = −109.5351, A4 = −4.6981E−02, A6 = −5.2149E−03,
A8 = 2.3271E−03, A10 = −2.8606E−05
8th Surface K = −7.6967, A4 = −4.4993E−02, A6 = 8.0000E−03,
A8 = −1.4687E−03, A10 = 1.0444E−04

Various Data

| | |
|---|---|
| Focal Length | 3.6 |
| F-number | 2.8 |
| Half Angle of View | 37° |

Numerical Example 6
Unit mm

Surface Data

| Surface No. | r | d | nd | vd |
|---|---|---|---|---|
| 1* | 2.6104 | 0.47 | 1.6402 | 23.38 |
| 2* | 1.3785 | 0.93 | 1.5330 | 55.69 |
| 3* | −5.4343 | 0.11 | | |
| 4 (Stop) | ∞ | 0.40 | | |
| 5* | 17.6784 | 0.83 | 1.5330 | 55.69 |
| 6* | −1.3099 | 0.44 | | |
| 7* | −0.7706 | 0.38 | 1.5330 | 55.69 |
| 8* | 417.1172 | 0.30 | | |
| 9 | ∞ | 0.55 | 1.5183 | 64.14 |
| 10 | ∞ | 0.3 | | |
| Image Plane | ∞ | | | |

Aspheric Data

1st Surface

K = −2.2343, A4 = −1.8606E−02, A6 = −7.2923E−03,
A8 = −2.1910E−03
2nd Surface

K = −0.1236, A4 = −6.8987E−02, A6 = 1.8223E−03,
A8 = −1.1177E−02
3rd Surface

K = 7.3261, A4 = −3.7187E−02, A6 = 3.8951E−03,
A8 = 4.5930E−04
5th Surface

K = 23.0264, A4 = −6.3474E−02, A6 = −3.1497E−02,
A8 = −3.1229E−02
6th Surface

K = −3.1846, A4 = −1.6810E−01, A6 = −1.2112E−02,
A8 = −2.1877E−02, A10 = −1.8140E−02
7th Surface K = −1.3959, A4 = −1.5419E−01, A6 = −7.7440E−02,
A8 = 1.5522E−03, A10 = 4.7748E−03
8th Surface K = 4.547E+04, A4 = −1.6999E−02, A6 = 8.0000E−03,
A8 = −1.7786E−03, A10 = 1.2567E−04

Various Data

| | |
|---|---|
| Focal Length | 3.6 |
| F-number | 2.8 |
| Half Angle of View | 37° |

| Condition | Example 1 | Example 2 |
|---|---|---|
| (1) | 0.9 | 0.8 |
| (2) | 0.8 | 1.0 |
| (3) | −1.1 | −1.3 |

| Condition | Example 3 | Example 4 |
|---|---|---|
| (1) | 0.5 | 0.8 |
| (2) | 1.2 | 1.0 |
| (3) | −1.2 | −1.3 |
| (5) | 0.1 | 0.1 |
| (6) | 33 | 33 |

| Condition | Example 5 | Example 6 |
|---|---|---|
| (1) | 3.3 | 0.4 |
| (2) | 0.2 | 1.7 |
| (3) | −0.8 | −1.5 |

FIGS. 7 to 12 are aberration diagrams for the imaging optical systems of Examples 1 to 6, respectively. In the diagrams for spherical aberration, coma and chromatic aberration of magnification, the solid line, dotted line and one-dot chain line are indicative of the quantities of the respective aberrations (in mm) at the C-line, d-line and F-line, respectively. In the astigmatism diagrams, solid line S and dotted line M are indicative of the sagittal image plane (in mm) and the meridional image plane (in mm), respectively. In the distortion diagrams, the solid line is indicative of distortion (in %) at the d-line.

What is claimed is:

1. An imaging optical system, characterized by comprising, in order from an object side thereof, a first lens group having positive refracting power, a stop, a second lens group having positive refracting power and a third lens group having negative refracting power, wherein:

said first lens group comprises a cemented lens consisting of a first lens and a second lens;

said second lens group comprises a third lens;

said third lens group comprises a fourth lens, wherein said fourth lens has an object-side surface defined by a concave surface when viewed from the object side on and off an optical axis of the optical system, and an image-side surface defined by an aspheric surface that is convex when viewed from the object side on the optical axis and has one or more inflection points off the optical axis;

said cemented lens is made up by cementing together said first lens formed of a resin layer and said second lens formed of a resin layer;

said first lens is a positive lens;

said second lens satisfies the following condition (5); and said cemented lens satisfies the following condition (6):

$$0.05 \leq t \leq 0.2 \quad (5)$$

$$20 \leq v2-v1 \leq 40 \quad (6)$$

where t is a thickness (in mm) of said second lens, v1 is an Abbe constant of said second lens, and v2 is an Abbe constant of said first lens.

2. The imaging optical system according to claim 1, which satisfies the following conditions (1) and (2):

$$D2/D1<4 \quad (1)$$

$$0.1<R6/R7<1.5 \quad (2)$$

where D1 is a length, as calculated on an air basis, of an axial chief ray between an image-side surface of said third lens and an object-side surface of said fourth lens, D2 is a length, as calculated on an air basis, of an off-axis chief ray having a maximum image height between the image-side surface of said third lens and the object-side surface of said fourth lens, R6 is a radius of curvature of the image-side surface of said third lens, and R7 is a radius of curvature of the object-side surface of said fourth lens.

3. The imaging optical system according to claim 1, characterized by satisfying the following condition (3):

$$0.5<IH/\exp<1.5 \quad (3)$$

where exp is a distance from a position of an exit pupil having a maximum angle of view to an image plane, and IH is an image height.

4. An imaging optical system, characterized by comprising, in order from an object side thereof, a first lens group having positive refracting power, a stop, a second lens group having positive refracting power and a third lens group having negative refracting power, wherein:

said first lens group comprises a cemented lens consisting of a first lens and a second lens;

said second lens group comprises a third lens;

said third lens group comprises a fourth lens, wherein said fourth lens has an object-side surface defined by a concave surface when viewed from the object side on and off an optical axis of the optical system, and an image-side surface defined by an aspheric surface that is convex when viewed from the object side on the optical axis and has one or more inflection points off the optical axis; and the object-side surface of the fourth lens is made up of an aspheric surface, with satisfaction of the following condition (4):

$$-10<A4<0, -10<A6<0 \quad (4)$$

where r is a paraxial radius of curvature of the aspheric surface,

K is a conical coefficient,

Ai (i=4, 6, 8, 10) is an i-th order aspheric coefficient, h is a height from an optical axis, and Z is a distance from a tangent plane of a point on the aspheric surface at the height h from the optical axis and an apex of the aspheric surface, and wherein a surface shape of the object-side surface of said fourth lens is represented by the following aspheric equation:

$$Z=(h^2/r)/[1+\{1-(K+1)\cdot(h/r)^2\}^{1/2}]+A4\times h^4+A6\times h^6+A8\times h^8+A10\times h^{10}.$$

* * * * *